(12) United States Patent
Maguire et al.

(10) Patent No.: US 7,523,604 B2
(45) Date of Patent: Apr. 28, 2009

(54) THRUST REVERSER MOUNTING STRUCTURE

(75) Inventors: Alan R Maguire, Derby (GB); Kenneth F Udall, Kirk Hallam (GB); Richard G Stretton, Loughborough (GB)

(73) Assignee: Rolls-Royce plc, London (GB)

( * ) Notice: Subject to any disclaimer, the term of this patent is extended or adjusted under 35 U.S.C. 154(b) by 396 days.

(21) Appl. No.: 11/363,040

(22) Filed: Feb. 28, 2006

(65) Prior Publication Data

US 2009/0071122 A1 Mar. 19, 2009

(30) Foreign Application Priority Data

Mar. 14, 2005 (GB) ................................ 0505184.2

(51) Int. Cl.
*F02K 1/54* (2006.01)
(52) U.S. Cl. ........................................ 60/226.2; 60/797
(58) Field of Classification Search ................ 60/226.1, 60/226.2, 262, 263, 797; 244/54, 110 B; 248/554

See application file for complete search history.

(56) References Cited

U.S. PATENT DOCUMENTS

| 5,239,822 A | 8/1993 | Buchacher |
| 5,941,061 A * | 8/1999 | Sherry et al. ................ 60/226.1 |
| 6,516,606 B2 * | 2/2003 | Fournier et al. ............... 60/262 |
| 6,604,355 B1 | 8/2003 | Sternberger |
| 6,820,410 B2 * | 11/2004 | Lair ............................ 60/204 |

FOREIGN PATENT DOCUMENTS

| EP | 0 913 570 A | 4/2001 |
| EP | 1 288 479 A | 6/2004 |

* cited by examiner

*Primary Examiner*—Louis J Casaregola
(74) *Attorney, Agent, or Firm*—W. Warren Taltavull; Manelli Denison & Selter PLLC

(57) ABSTRACT

A gas turbine engine comprising a core engine surrounded by a core casing, at least one C-duct having radially inner and outer walls and a thrust reverser unit; the engine is mounted to an aircraft pylon via at least one thrust member attached to the core engine; the thrust reverser unit is mounted within the outer wall of the C-duct; the C-duct is secured to the core casing via a vee-groove attachment comprising vee-groove and vee-blade parts, the attachment is arranged to transfer loads between the thrust reverser unit and the pylon; wherein one cooperating part of the attachment is mounted to a torsion box mounted on the inner wall of the C-duct.

6 Claims, 4 Drawing Sheets

THRUST REVERSER MOUNTING STRUCTURE

FIELD OF THE INVENTION

The present invention relates to a gas turbine engine thrust reverser mounting structure for transferring loads between the thrust reverser and an aircraft pylon structure of an aircraft.

BACKGROUND OF THE INVENTION

Certain gas turbine engines are mounted to the pylon via thrust links attached to the core of the engine, such as the Trent 500 of Rolls-Royce plc, shown in FIG. 1. These arrangements employ only one vee-groove attachment feature to transfer thrust reverser (TRU) axial load into the engine core. The vee-groove itself is disposed around the outside of a fan casing and cooperates with a vee-blade feature on a conventional C-duct, thereby securing the TRU to the engine. This vee-groove is positioned at the rear of the rear fancase. The TRU axial load is transferred to the thrust links via an annular array of fan outlet guide vanes (OGV), through an OGV twin plane support and into the core of the engine. One problem of this arrangement is the high bending loads applied through the OGV, which in turn causes high bending stresses through the engine core. Notably the load path from the outer vee-groove is tortuous and thus the structure is required to be strong and therefore heavy. In particular, the OGV twin plane supports carry substantial bending and axial loads and are significantly heavy. Furthermore, clearance gaps between compressor and turbine blades and their casings must be increased to accommodate the core engine bending deflections and therefore the engine does not operate as efficiently as possible.

Other gas turbine engines, such as the Trent 800 of Rolls-Royce plc, shown in FIG. 2, employ a second and radially inner vee-groove. However, this arrangement is only possible as there is no pylon core mounting arrangement, which would otherwise obstruct the inner vee-groove.

A more serious problem with both the prior art arrangements is that the vee-blade of the C-duct is relatively weak compared to the circumferential stiffness of the engine core vee-groove, which is usually annular. Thus it is possible for the vee-blade to deflect significantly so that bypass air may enter the C-duct structure itself causing serious structural damage bend. Such bending might also lead to disengagement the vee-groove and vee-blade, which is clearly undesirable.

SUMMARY OF THE INVENTION

Thus it is an object of the present invention to solve the aforementioned problems.

According to the present invention there is provided a gas turbine engine comprising a core engine surrounded by a core casing, at least one C-duct having radially inner and outer walls and a thrust reverser unit; the engine is mounted to an aircraft pylon via at least one thrust member attached to the core engine; the thrust reverser unit is mounted within the outer wall of the C-duct; the C-duct is secured to the core casing via an attachment comprising cooperating parts, the attachment is arranged to transfer loads between the thrust reverser unit and the pylon; wherein one cooperating part of the attachment is mounted to a torsion box mounted on the inner wall of the C-duct. Thus the inclusion of the torsion box 52 means that the attachment 42 is sufficiently rigid to prevent deflections which might allow ingress of bypass air radially inwardly of the inner wall 48.

Preferably, the attachment comprises a vee-groove attachment having cooperating vee-groove and vee-blade parts.

Preferably, the torsion box is substantially triangular in cross-section.

Alternatively, the torsion box is substantially parallelepiped in cross-section.

Preferably, the engine comprises a fan casing and the C-duct is further secured to the engine via another vee-groove attachment disposed between the fan casing and outer wall.

Preferably, one part of the vee-groove attachment is mounted to an annular structure on the core casing.

BRIEF DESCRIPTION OF THE DRAWINGS

The present invention will now be described, by way of example only, with reference to the following figures in which.

DETAILED DESCRIPTION OF THE INVENTION

Figure 1:
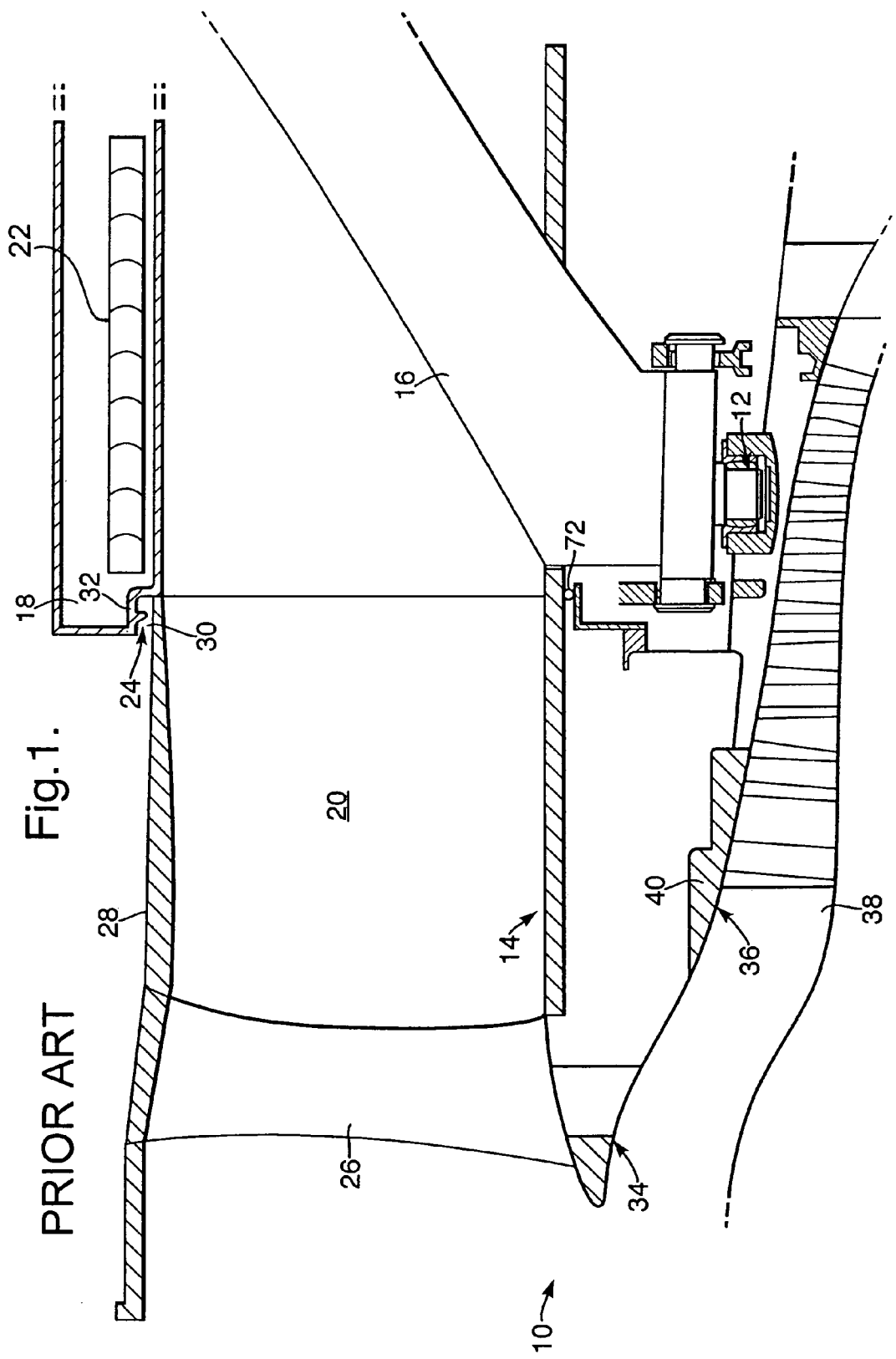
FIG. 1 is a section of the Trent 500 of Rolls-Royce plc showing its core mounting arrangement and C-duct outer vee-groove attachment.

Referring to FIG. 1, the Trent 500 gas turbine engine 10 of Rolls-Royce plc is mounted to a pylon via thrust trunion (or member) 12, a front mount 16 and a rear mount (not shown) each attached to the core 14 of the engine. The front mount 16 supports vertical and side loads, while the rear mount supports vertical, side and torsion loads. Two conventional C-ducts 18 surround the core engine 14 and define part of a bypass duct 20. The C-ducts 18 house conventional thrust reverser units 22. The C-ducts 18 are hingedly attached to a pylon at their upper ends and in operation are releasably closed underneath the engine. When closed, the C-ducts 18 are secured to the engine via a vee-groove attachment 24 which transfers thrust reverser (TRU) axial loads through an array of outlet guide vanes 26, into the engine core 14 and to the pylon mountings 12, 16.

During engine operation, the C-duct 18 is subject not only to thrust reversing loads, but also aerodynamic loads and pressure loads within the bypass duct 20.

The vee-groove attachment 24 comprises a vee-groove 30 that is formed by and around the outside of a fan casing 28 and a cooperating vee-blade 32 mounted on the C-duct 18. In this way the C-duct 18 housing the TRU 22 is secured to the engine and pylon. This vee-groove attachment 24 is positioned at the rear of the fan case 28. The TRU 22 axial load is transferred to the thrust support 12 via the OGVs, through an OGV twin plane support 34 and into the core 14 of the engine 10. One problem of this arrangement is the high bending loads applied through the OGV, caused by the TRU thrust loads, which in turn causes high bending stresses through the engine core 14. Notably the load path from the outer vee-groove attachment 46 is tortuous and thus the aforementioned structure is required to be strong and therefore heavy. In particular, the OGV twin plane supports 34 carry substantial bending and axial loads and are significantly heavy. Furthermore, clearance gaps 36 between compressor 38 and turbine blades and their casings 40 must be sufficiently large to accommodate the core engine bending deflections and therefore the engine does not operate as efficiently as possible.

Figure 2:
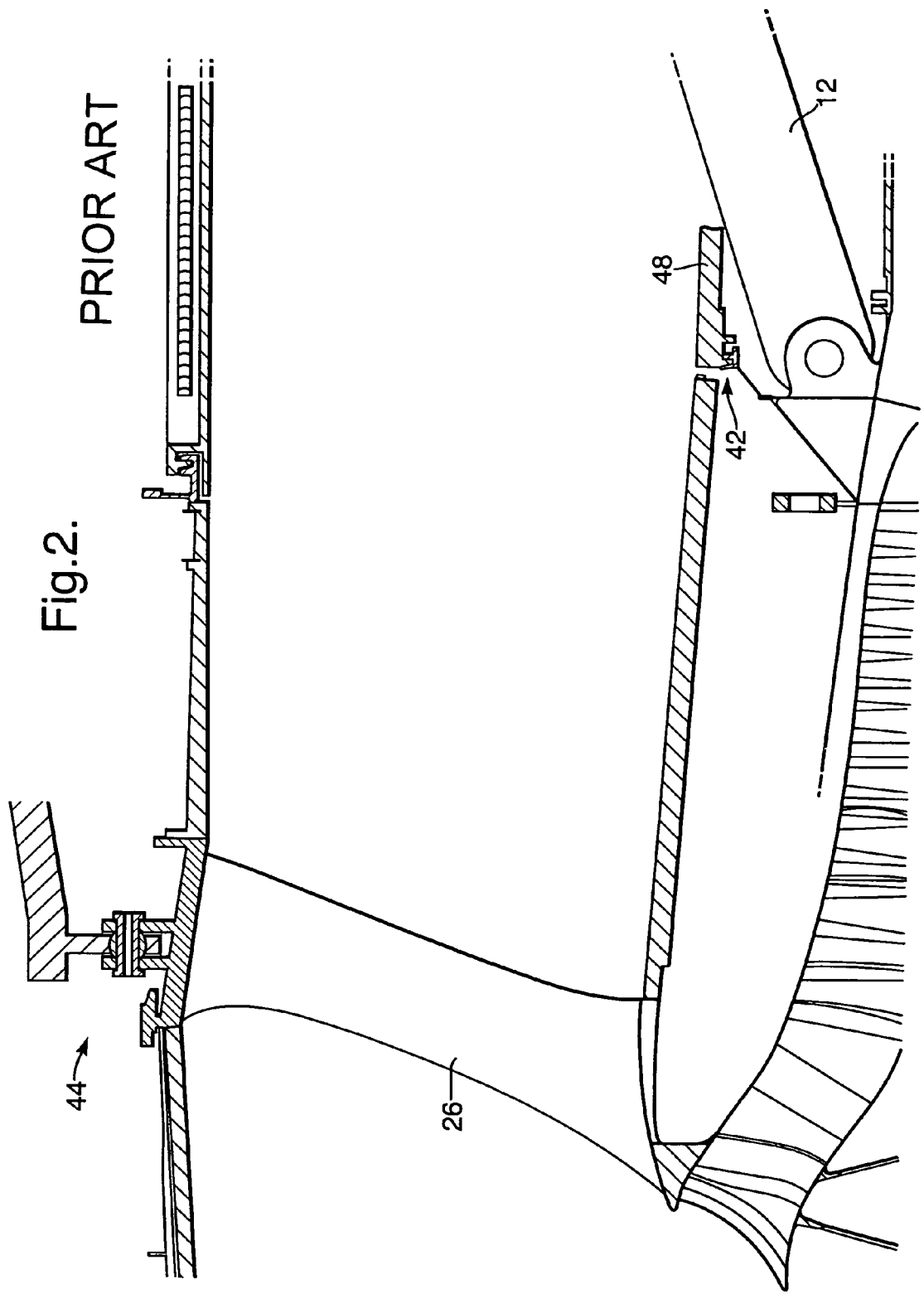
FIG. 2 is a section of the Trent 800 of Rolls-Royce plc showing its core mounting arrangement and C-duct outer and inner vee-groove attachments.

Other gas turbine engines, such as the Trent 800 of Rolls-Royce plc, shown in FIG. 2, employ a second and radially inner vee-groove attachment 42. However, an inner vee-groove attachment 42 is only possible as there is no pylon core mounting arrangement (16 in FIG. 1), which would otherwise obstruct the inner vee-groove attachment 42. In this mounting arrangement, there are thrust links (or members) 12, but instead of the front core mount (16 in FIG. 1) there is a fan case front mount 44. The fan case front mount 44 accommodates vertical and side loads, while a rear mount accommodates vertical, side and torsion loads.

Both these known arrangements are adequate for their particular applications, however, for other applications they have a common disadvantage. The vee-blade 32 of the C-duct is relatively weak compared to the circumferential stiffness of the engine core vee-groove attachment 24, 42 which is annular. Thus it is possible for the vee-blade to deflect significantly, disengaging seals (72 in FIG. 1) so that bypass air may enter the C-duct structure itself causing serious structural damage bend. Thus it is possible for the vee-blade 32 to bend and disengage the vee-groove 30 during thrust reversing operations. If disengagement occurred fan bypass air could enter the C-duct structure itself causing structural damage.

One solution to counteract this potential failure mechanism is the inclusion of an inboard latch system close to the C-duct vee-blade attachment 24. However, such mechanisms are considered complicated with difficult access and are prone to unreliability themselves. Furthermore, these latches are not visible from the outside of the engine and consequently may be left open.

Figure 3:
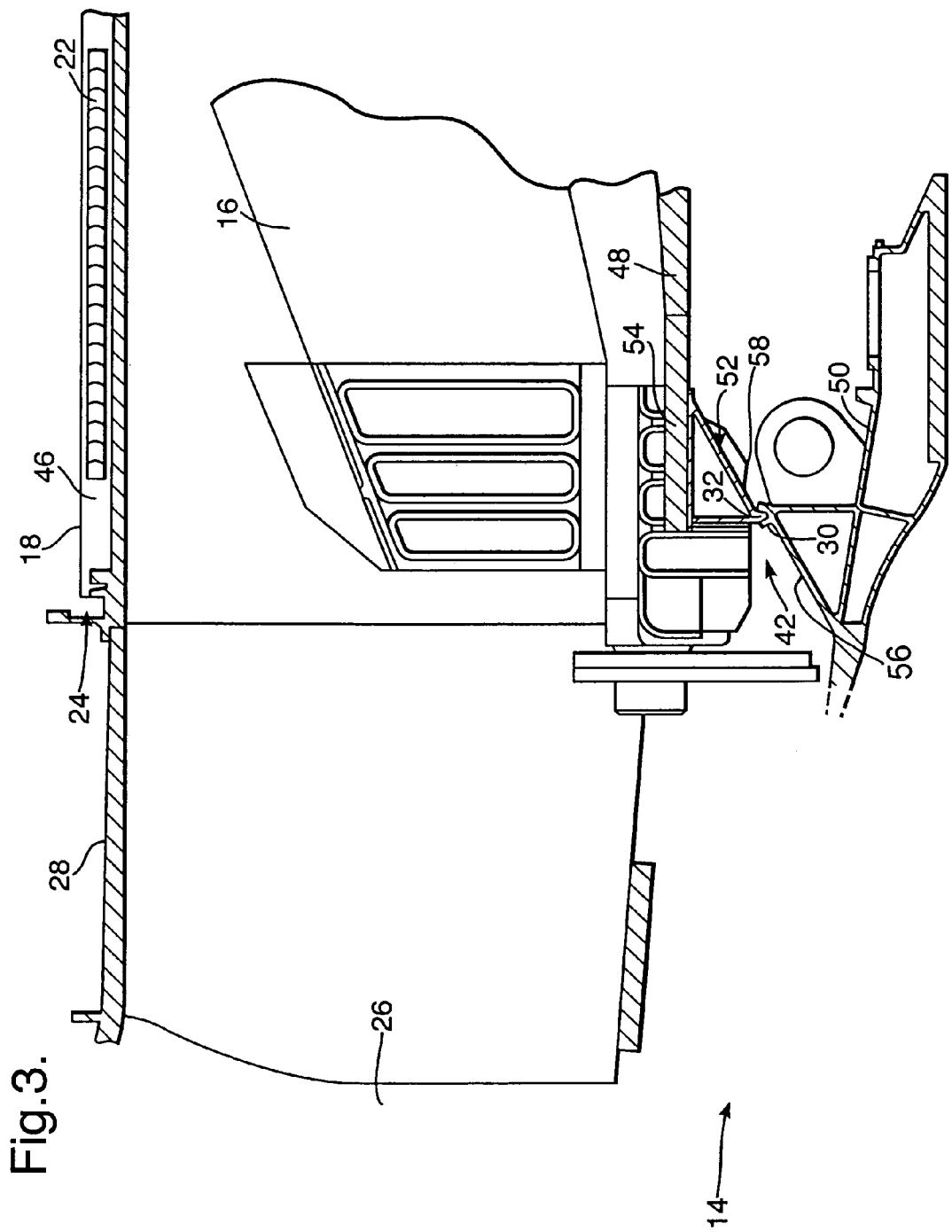
FIG. 3 is a part section of an engine showing a thrust reverser mounting structure in accordance with the present invention.

FIG. 3 shows an exemplary embodiment of the present invention where in the engine is mounted to the pylon via a core engine main mount 16. The C-duct comprises an outer wall 46 that is securable to the fan casing 28 via outer vee-groove arrangement 24 and an inner wall 48 of the C-duct 18 is securable to a core engine casing 50 via inner vee-groove arrangement 42. The invention relates particularly to the inclusion of a stiffening or torsion box 52 to a leading edge 54 of the inner wall 48 of the C-duct 18; the vee-blade 32 is supported by the torsion box 52.

The inner vee-groove 30 is supported on an annular triangular structure 56 mounted from the casing 50 of the engine core. The triangular structure 56 and vee-groove 30 are radially closer to the core engine casing 50 rather than extending all the way out to the underside of the C-duct inner wall 48 as with the prior art Trent 800. This allows a continuous hoop to be achieved and avoids a clash with the attachment feature 58 of the front mount 16.

An inner vee-blade 32 is mounted to both the port and starboard C-ducts by means of the torsion box 52 attached to the inner walls 48. The torsion box 52 provides a means of traversing the radial distance between the inner wall 48 and the reduced radius vee-groove 30. The torsion box 52 is also an efficient structure for transferring axial load from the TRU into the engine core as it stiffens the leading edge of the inner wall 48 so that the potential requirement for an internal latch is negated.

Furthermore, the torsion box 52 is particularly efficient for load transfer within the TRU structure at the top and bottom bifurcation positions where load transfer is traditionally concentrated.

The torsion box is advantageous in improving the roundness of the vee-blade 32 particularly at the 3 o' clock and 6 o' clock positions, where the prior art designs may be prone to disengagement.

Other advantages of the present invention include reduction in wear due to reduced relative movements between blade 32 and groove 30 and improved tolerance control for vee-blade machining in situ.

Figure 4:
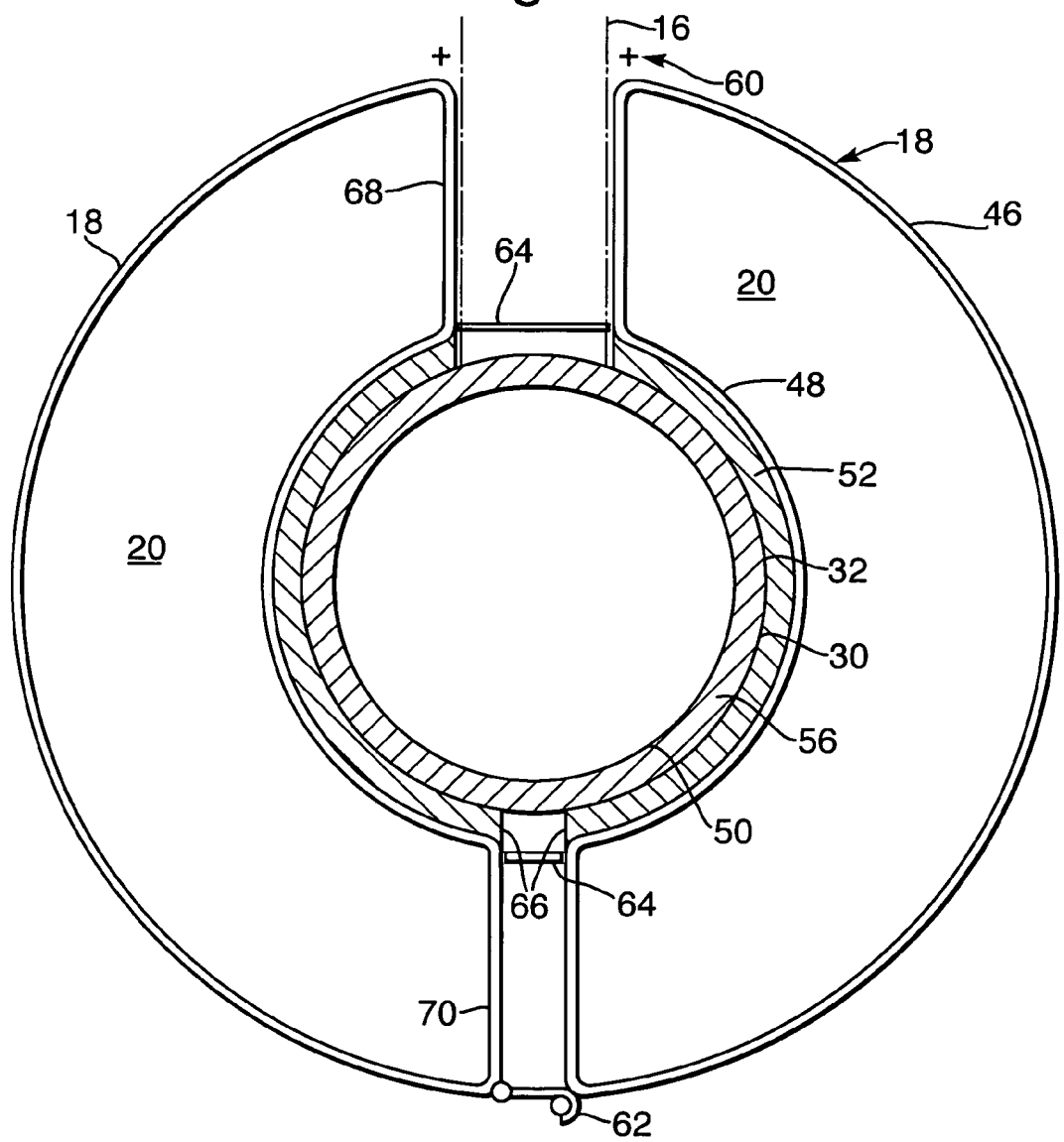
FIG. 4 is a cross-section of FIG. 3.

FIG. 4 shows further details of the present invention. The C-ducts 18 are hingedly attached at 60 to the pylon 16 at their upper ends and in operation are releasably closed underneath the engine via conventional catches 62. Bumper bars 64 are incorporated within the C-ducts to provide hoop continuity for roundness control of the inner walls 48. The torsion box 52 comprises end plates 66 which provide structure for load transfer of the bumper bars 64 at the junction between the inner wall 48 and the upper and lower bifurcation walls (68, 70).

In its broadest sense the invention relates to a gas turbine engine 10 comprising a core engine 14 surrounded by a core casing 50. At least one C-duct 18 partially surrounds the engine and has radially inner and outer walls 48, 46 and a thrust reverser unit 22 is mounted within the outer wall 46. The engine 10 is mounted to an aircraft pylon via at least one thrust member 12 attached to the core engine 14, although there may be a number of different arrangements of front and rear mounts. The C-duct 18 is secured to the core casing 50 via an attachment 42 comprising cooperating parts 30, 32, the attachment 42 is arranged to transfer loads between the thrust reverser unit 22 and the pylon 16. Although the description above specifies a vee-groove attachment with cooperating vee-groove and vee-blades, there are many other ways of securing the C-duct to the engine such that thrust loads may be transferred. Significantly, the invention is characterised by one cooperating part of the attachment 30, 32 being mounted to a torsion box 52 mounted on the inner wall 48 of the C-duct 18. Thus the inclusion of the torsion box 52 means that the attachment 42 is sufficiently rigid to prevent deflections which might allow ingress of bypass air radially inwardly of the inner wall 48.

Although the torsion box 52 described with reference to FIG. 3, is substantially triangular in cross-section alternative cross-sectional shapes are possible without departing from the scope of the present invention. Other suitable shapes include parallelepiped, rhombic or other closed shapes.

As shown in FIG. 4 the engine comprises the C-duct 18 is further secured to the engine via another attachment, preferably a vee-groove 24 disposed between the fan casing 28 and outer wall 46.

Preferably, one part of the vee-groove attachment 30, 32 is mounted to an annular structure, such as the triangular structure 56 mounted on the core casing 50. Thus the vee-groove attachment 42 is particularly stiff.

We claim:

1. A gas turbine engine comprising a core engine surrounded by a core casing, at least one C-duct having radially inner and outer walls and a thrust reverser unit; the engine is mounted to an aircraft pylon via at least one thrust member attached to the core engine; the thrust reverser unit is mounted within the outer wall of the C-duct; the C-duct is secured to the core casing via an attachment comprising cooperating parts, the attachment is arranged to transfer loads between the thrust reverser unit and the pylon; wherein one cooperating part of the attachment is mounted to a torsion box mounted on the inner wall of the C-duct.

2. A gas turbine engine as claimed in claim 1 wherein the attachment comprises a vee-groove attachment having cooperating vee-groove and vee-blade parts.

3. A gas turbine engine as claimed in claim 1 wherein the torsion box is substantially triangular in cross-section.

4. A gas turbine engine as claimed in claim 1 wherein the torsion box is substantially parallelepiped in cross-section.

5. A gas turbine engine as claimed in claim 2 wherein the engine comprises a fan casing and the C-duct is further secured to the engine via another vee-groove attachment disposed between the fan casing and outer wall.

6. A gas turbine engine as claimed in claim 2 wherein one part of the vee-groove attachment is mounted to an annular structure on the core casing.

* * * * *